US010947359B2

(12) United States Patent
Yamamoto et al.

(10) Patent No.: US 10,947,359 B2
(45) Date of Patent: Mar. 16, 2021

(54) BEAD EXPANDED MOLDED ARTICLE, RESIN EXPANDED PARTICLES, METHOD FOR PRODUCING RESIN EXPANDED PARTICLES, EXPANDABLE RESIN PARTICLES AND METHOD FOR PRODUCING BEAD EXPANDED MOLDED ARTICLE

(71) Applicant: SEKISUI PLASTICS CO., LTD., Osaka (JP)

(72) Inventors: Hiromaru Yamamoto, Nara (JP); Hironori Kobayashi, Nara (JP); Haruhiko Matsuura, Nara (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 0 days.

(21) Appl. No.: 16/701,369

(22) Filed: Dec. 3, 2019

(65) Prior Publication Data

US 2020/0102439 A1 Apr. 2, 2020

Related U.S. Application Data

(62) Division of application No. 15/323,787, filed as application No. PCT/JP2015/077704 on Sep. 30, 2015, now Pat. No. 10,815,354.

(30) Foreign Application Priority Data

Sep. 30, 2014 (JP) .............................. JP2014-200892
Dec. 17, 2014 (JP) .............................. JP2014-255231

(51) Int. Cl.
| | | |
|---|---|---|
| *C08J 9/18* | (2006.01) | |
| *C08J 9/16* | (2006.01) | |
| *C08J 9/232* | (2006.01) | |
| *C08J 9/14* | (2006.01) | |
| *C08J 9/228* | (2006.01) | |

(52) U.S. Cl.
CPC ............. *C08J 9/18* (2013.01); *C08J 9/142* (2013.01); *C08J 9/16* (2013.01); *C08J 9/228* (2013.01); *C08J 9/232* (2013.01); *C08J 2201/03* (2013.01); *C08J 2203/12* (2013.01); *C08J 2205/052* (2013.01); *C08J 2379/08* (2013.01); *C08J 2381/06* (2013.01)

(58) Field of Classification Search
CPC ....... C08J 9/18; C08J 9/16; C08J 9/232; C08J 9/142; C08J 9/228; C08J 2381/06; C08J 2379/08; C08J 2201/03; C08J 2205/052; C08J 2203/12; B29B 9/12; B29B 11/10; C08L 79/08; C08L 81/06
See application file for complete search history.

(56) References Cited

U.S. PATENT DOCUMENTS

| | | |
|---|---|---|
| 4,532,263 A | 7/1985 | Krutchen et al. |
| 4,629,745 A | 12/1986 | Hoki et al. |
| 4,727,093 A | 2/1988 | Allen et al. |
| 5,091,126 A | 2/1992 | Weber et al. |
| 5,095,041 A | 3/1992 | Bopp |
| 5,128,073 A | 7/1992 | Allen et al. |
| 5,670,102 A | 9/1997 | Perman et al. |
| 5,708,041 A | 1/1998 | Scheckenbach et al. |
| 6,527,993 B1 | 3/2003 | Hirai et al. |
| 7,045,082 B2 | 5/2006 | Dietzen et al. |
| 7,655,705 B2 | 2/2010 | Scherzer et al. |
| 9,969,854 B2 | 5/2018 | Kenkare et al. |
| 2004/0167241 A1 | 8/2004 | Scherzer et al. |
| 2004/0212119 A1 | 10/2004 | Dietzen et al. |
| 2005/0153134 A1 | 7/2005 | Sasaki et al. |
| 2006/0125136 A1 | 6/2006 | Kratzmuller |
| 2007/0149629 A1 | 6/2007 | Donovan et al. |
| 2014/0227506 A1 | 8/2014 | Kuwabara et al. |
| 2014/0256835 A1 | 9/2014 | Klesing et al. |
| 2017/0022344 A1 | 1/2017 | Kenkare et al. |

FOREIGN PATENT DOCUMENTS

| | | |
|---|---|---|
| CN | 1124194 | 10/2003 |
| CN | 103764738 | 4/2014 |
| DE | 102011110216 | 2/2012 |
| EP | 0186308 | 7/1986 |
| EP | 0373402 | 6/1990 |
| EP | 0425886 | 5/1991 |
| EP | 0610953 | 8/1994 |
| JP | 59-36139 | 2/1984 |
| JP | S60-501608 | 9/1985 |
| JP | S63-150337 | 6/1988 |
| JP | H03-143933 | 6/1991 |
| JP | H03-190939 | 8/1991 |
| JP | H03-192135 | 8/1991 |
| JP | 6-322168 | 11/1994 |
| JP | 2003-192818 | 7/2003 |
| JP | 2004-263184 | 9/2004 |

(Continued)

OTHER PUBLICATIONS

Third-party observation for European Application No. 15846822.3, issued on Apr. 9, 2019.
Office Action in Chinese Application No. 201580045799.9 dated Feb. 22, 2019 (with English machine translation).
Notice of Allowance in corresponding Japanese Application No. 2016-204412, dated Jan. 8, 2019.
International Preliminary Report on Patentability issued with respect to Application No. PCT/JP2015/077704, dated Apr. 4, 2017.
International Search Report issued with respect to Application No. PCT/JP2015/077704, dated Dec. 28, 2015.

*Primary Examiner* — Kara B Boyle
(74) *Attorney, Agent, or Firm* — Greenblum & Bernstein, P.L.C.

(57) ABSTRACT

Provided is a bead expanded molded article comprising a plurality of resin expanded particles that are fusion-bonded with each other, in which the resin expanded particles mainly include a resin having a glass transition temperature of 180° C. or more.

2 Claims, 5 Drawing Sheets

(56) References Cited

FOREIGN PATENT DOCUMENTS

| | | |
|---|---|---|
| JP | 2009-521548 | 6/2009 |
| JP | 2012-7040 | 1/2012 |
| TW | 200530297 | 9/2005 |
| WO | 8403095 | 8/1984 |
| WO | 87/00481 | 1/1987 |
| WO | 2013/053851 | 4/2013 |
| WO | 2015/097058 | 7/2015 |

OTHER PUBLICATIONS

European Search Repot issued in European Patent Office (EPO) Patent Application No. 15846822.3, dated Apr. 3, 2018.

BEAD EXPANDED MOLDED ARTICLE, RESIN EXPANDED PARTICLES, METHOD FOR PRODUCING RESIN EXPANDED PARTICLES, EXPANDABLE RESIN PARTICLES AND METHOD FOR PRODUCING BEAD EXPANDED MOLDED ARTICLE

CROSS-REFERENCE TO RELATED APPLICATIONS

This is a divisional application of U.S. Pat. No. 15/323,787, filed on Jan. 4, 2017, which is a U.S. National stage of International Patent Application No. PCT/JP2015/077704, filed on Sep. 30, 2015 which claims priority to Japanese Patent Application No. 2014-200892, filed on Sep. 30, 2014 and Japanese Patent Application No. 2014-255231, filed on Dec. 17, 2014. The disclosure of each of these applications is hereby incorporated by reference in its entirety.

TECHNICAL FIELD

The present invention relates to a bead expanded molded article, resin expanded particles, a method for producing resin expanded particles, expandable resin particles, and a method for producing a bead expanded molded article.

BACKGROUND TECHNOLOGY

In the past, a bead expanded molded article obtained by molding expandable polystyrene-based resin particles consisting of a polystyrene-based resin composition is called EPS or the like, and has widely been utilized as a heat insulating material or a buffer material.

The bead expanded molded article is prepared, for example, by once expanding expandable resin particles in the non-expanded state to prepare resin expanded particles (pre-expanded particles), and heating the resin expanded particles in a mold to perform secondary expansion, and is widely used as a conveying container for farm products and seafood, or the like (see the following Patent Document 1).

That is, the conventional bead expanded molded article is composed of secondarily expanded resin expanded particles (secondarily expanded particles), and is formed of a plurality of resin expanded particles that are fusion-bonded with each other.

PRIOR ART DOCUMENTS

Patent Documents

Patent Document 1: Japanese Unexamined Patent Application, First Publication No. 2012-007040

SUMMARY OF THE INVENTION

Problem to be Solved by the Invention

In recent years, such a bead expanded molded article has become to be required to have heat resistance.

However, the conventional bead expanded molded article cannot sufficiently satisfy a demand for heat resistance, since a glass transition temperature of a polystyrene-based resin which is a main raw material thereof is around 100° C.

In addition, it can also be considered that resin expanded particles including mainly a resin having a higher glass transition temperature than that of a polystyrene-based resin is adopted as a material for forming the bead expanded molded article, but even when a resin having a high glass transition temperature is simply utilized, properties required as the bead expanded molded article may not be satisfied.

In the bead expanded molded article, for example, unless the manufacturing condition suitable for melt property of a raw material resin is selected, the open-cell rate becomes high, and sufficient strength may not be exerted, or the expanding ratio becomes low, and lightweight property may not be excellent.

For this reason, it has become difficult to obtain a bead expanded molded article having excellent heat resistance.

An object of the present invention is to solve such problem and to provide a bead expanded molded article having excellent heat resistance.

Means for Solving the Problem

In order to solve the problem, the present invention provides a bead expanded molded article comprising a plurality resin expanded particles that are fusion-bonded with each other, in which the resin expanded particles mainly include a resin having a glass transition temperature of 180° C. or more.

BEST MODE FOR CARRYING OUT THE INVENTION

Figure 1:
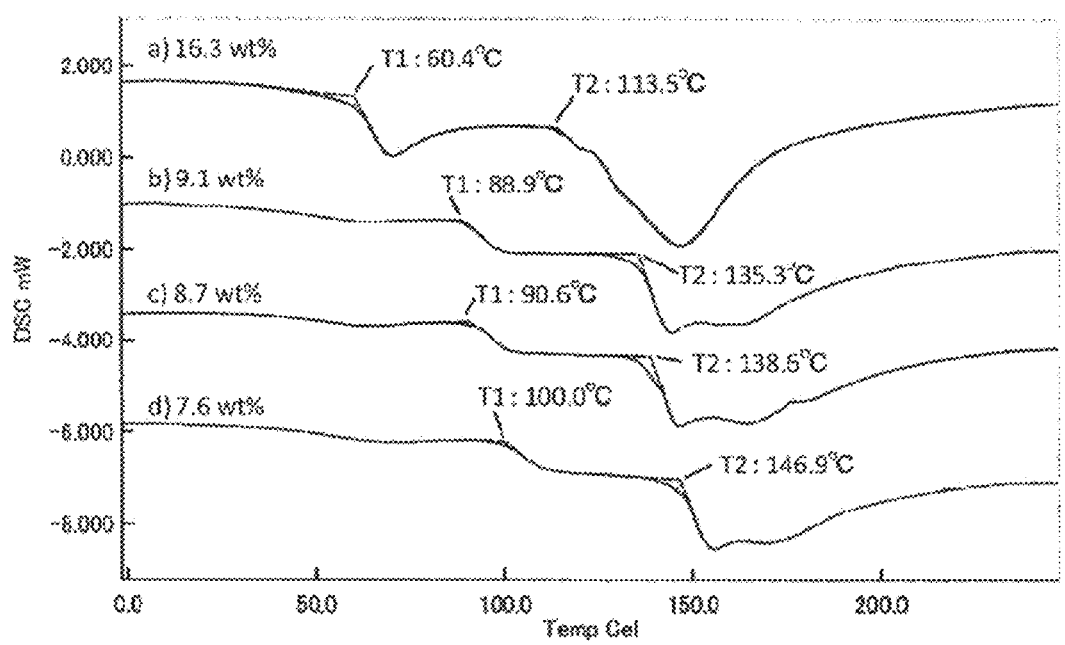
FIG. 1 is a graph drawing a DSC curve of expandable resin particles having different blowing agent impregnation states.

Embodiments of the present invention will be explained below.

The bead expanded molded article of the present invention is a bead expanded molded article comprising a plurality of resin expanded particles that are fusion-bonded with each other.

The bead expanded molded article of the present embodiment is formed by preparing expandable resin particles containing a blowing agent, preparing resin expanded particles (pre-expanded particles) obtained by primarily expanding the expandable resin particles, and thereafter, secondarily expanding the pre-expanded particles in a molding cavity.

The bead expanded molded article of the present embodiment may be a bead expanded molded article formed by hot cutting a resin composition containing a blowing agent while extruding the composition from an extruder, and secondarily expanding resin expanded particles (pre-expanded particles) which have been expanded upon the extrusion in a molding cavity.

That is, the bead expanded molded article of the present embodiment is composed of secondarily expanded resin expanded particles (secondarily expanded particles).

In the bead expanded molded article of the present embodiment, the resin expanded particles include mainly a resin having a glass transition temperature of 180° C. or more.

First Embodiment

First, as a first embodiment of the present invention, a method for preparing expandable resin particles containing a blowing agent, primarily expanding the expandable resin particles to prepare pre-expanded particles, and thereafter, preparing a bead expanded molded article of the pre-expanded particles will be explained.

The expandable resin particles of the present embodiment are resin particle which are non-expanded and consist of a resin composition containing a blowing agent together with a resin.

The resin composition constituting the expandable resin particles include mainly a highly heat-resistant resin having a glass transition temperature of 180° C. or more (hereinafter, also referred to as "highly heat-resistant resin"), and contains an organic-based physical blowing agent, as the blowing agent.

The expandable resin particles of the present embodiment is not particularly limited in its intended use, but is preferably utilized as raw material particles for preparing pre-expanded particles used in forming a bead expanded molded article by in-die molding.

That is, the expandable resin particles of the present embodiment can be primarily expanded to be used for forming a bead expanded molded article.

In addition, the expandable resin particles will be explained below, while exemplifying the case where the particles are primarily expanded to be utilized as pre-expanded particles used for forming a bead expanded molded article.

Examples of the highly heat-resistant resin which is a main component of the resin composition include a polyetherimide (PEI) resin, a polyethersulfone (PESU) resin, a polyphenylsulfone (PPSU) resin, a polysulfone (PSU) resin, and the like.

When the highly heat-resistant resin has an excessively high glass transition temperature, the resin has a possibility that it becomes difficult to subject the resin to pre-expansion or to form a bead expanded molded article by in-die molding.

Accordingly, the highly heat-resistant resin has a glass transition temperature of preferably 300° C. or less, and more preferably 260° C. or less.

It is not necessary that one kind of the highly heat-resistant resin alone is contained in the expandable resin particles, and two or more of the resins may also be contained in pre-expanded particles.

In addition, when the resin composition constituting the expandable resin particles contains a plurality of types of resins, a "main component of the resin composition" means a resin having the highest mass ratio, among resins contained in the resin composition.

A glass transition temperature of a resin contained in the expandable resin particles can be confirmed by the following method.

Method of Obtaining Glass Transition Temperature

The glass transition temperature is measured by a method described in JIS K7121:1987 "Testing Methods for Transition Temperatures of Plastics".

However, a sampling method and the temperature condition are as follows.

Using a differential scanning calorimetric device, DSC6220 Type (manufactured by SII Nano Technology Inc.), about 6 mg of a sample is filled on a bottom of a measurement container made of aluminum without forming any space, and a temperature is raised from 30° C. to 300° C. at a rate of 20° C./min. under a nitrogen gas flow rate of 20 mL/min., and from the resulting DSC curve, a midpoint glass transition temperature is calculated using analysis software attached to the device.

As a standard substance at that time, alumina is used.

This midpoint glass transition temperature is obtained by a method described in the above Standard (9.3 "Method of Obtaining Glass Transition Temperature").

The expandable resin particles can also contain a resin having a glass transition temperature of lower than 180° C., in addition to the highly heat-resistant resin, and contain the highly heat-resistant resin at preferably 50% by mass or more, more preferably 75% by mass or more, and particularly preferably 90% by mass or more.

It is particularly preferable that, in the expandable resin particles, a resin to be contained therein is composed of substantially only a highly heat-resistant resin.

Examples of the organic-based physical blowing agent contained in the expandable resin particles together with the resin include substances having a boiling point lower than a glass transition temperature of the highly heat-resistant resin (hydrocarbons, alcohols, diols, ketones, ethers and halides thereof, and the like), specifically, butane, pentane, methanol, ethanol, acetone, methyl ethyl ketone, cyclohexanone, cyclononanone, methylene chloride, methyl acetate, ethyl acetate, butyl acetate, methyl chloride, ethyl chloride, dichloromethane, dichloroethane, cyclohexanone, diacetone alcohol, propylene glycol monomethyl ether, propylene glycol monomethyl ether acetate, diethylene glycol dimethyl ether, dichlorodifluoromethane, dichlorotetrafluoroethane, trichlorofluoromethane, trichorotrifluoroethane, and the like.

The organic-based physical blowing agents may be used alone, or may be used by mixing two or more of them.

In addition to the organic-based physical blowing agent, for example, an inorganic-based physical blowing agent such as argon and carbon dioxide, or a thermally decomposable type chemical blowing agent such as azodicarbonamide, p-toluenesulfonyl semicarbazide, and 5-phenyltetrazole may be contained in the expandable resin particles.

In addition, unless otherwise indicated, a term of a "blowing agent" is used as a term meaning an "organic-based physical blowing agent" below.

The blowing agent is preferably an organic compound having a carbonyl group, such as acetone methyl ethyl ketone, cyclohexanone, and cyclononanone, and is preferably an organic compound having a structure represented by the following formula (a).

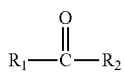

(a)

(wherein, $R_1$ and $R_2$ are an alkyl group of 1 to 6 carbon atoms, or an alkylene group of 1 to 6 carbon atoms, which is mutually bonded together with a carbon atom forming a carbonyl group to form a ring. $R_1$ and $R_2$ may be different or common in the number of carbons.)

Among them, acetone is suitable as the blowing agent in the present embodiment.

The blowing agent is contained in the expandable resin particles at the ratio of preferably 6% by mass or more, and more preferably 7% by mass or more.

Additionally, the blowing agent is contained in the expandable resin particles at the ratio of preferably 20% by mass or less, and more preferably 15% by mass or less.

When the expandable resin particles of the present embodiment have the excessively large particle diameter, it is difficult that the particles are impregnated with the blowing agent, and there is a possibility that production becomes difficult.

Additionally, when the expandable resin particles of the present embodiment have the excessively large particle diameter, since appearance of the resulting bead expanded molded article becomes deteriorated, and further, upon molding, the expandable resin particles hardly become to be filled into fine portions of a mold, a shape of a molding cavity becomes difficult to be precisely reflected on the bead expanded molded article.

That is, in the present embodiment, since it is advantageous to allow the expandable resin particles to exert good expandability, and obtain pre-expanded particles exhibiting good secondary expandability and a bead expanded molded article which has been expanded at a high expanding ratio, it is preferable that the expandable resin particles have a particle shape in which the maximum length becomes 3 mm or less.

In addition, since when the expandable resin particles are excessively small, it becomes easy to make the blowing agent scattered and lost upon formation of pre-expanded particles, the expandable resin particles have preferably the length of 0.3 mm or more.

Additionally, since when the expandable resin particles are prepared into pre-expanded particles, the particles having a shape near a sphere have the good ability to be filled into a mold, for example, in the case of a bar shape, it is preferable that the thickness thereof is 0.5-fold or more of the length.

In the present embodiment, the maximum length of the expandable resin particles is obtained by averaging values obtained by individually measuring the maximum length concerning randomly selected few tens of expandable resin particles, and is obtained as an arithmetic average.

In addition, the maximum length of the expandable resin particles means the length of the longest straight line among straight lines connecting different two points on an outer surface of the expandable resin particles.

In addition to the blowing agent and the highly heat-resistant resin mentioned above, a cell adjusting agent, a plasticizer, and the like may be further contained in the resin composition constituting the expandable resin particles of the present embodiment.

Examples of the cell adjusting agent include fine particles consisting of an inorganic compound such as talc, mica, silica, diatomaceous earth, aluminum oxide, titanium oxide, zinc oxide, magnesium oxide, magnesium hydroxide, aluminum hydroxide, calcium hydroxide, potassium carbonate, calcium carbonate, magnesium carbonate, potassium sulfate, barium sulfate, and glass beads, or fine particles consisting of an organic compound such as polytetrafluoroethylene.

Examples of the plasticizer include phthalic acid ester, adipic acid ester, trimellitic acid ester, phosphoric acid ester, citric acid ester, epoxidized vegetable oil, sebacic acid ester, azelaic acid ester, maleic acid ester, benzoic acid ester, sulfonic acid ester, and the like.

Examples of the phthalic acid ester include dioctyl phthalate, diisononyl phthalate, diisodecyl phthalate, dibutyl phthalate, and the like.

Examples of the adipic acid ester include dioctyl adipate, diisononyl adipate, diisobutyl adipate, dibutyl adipate, and the like.

Examples of the trimellitic acid ester include trioctyl trimellitate and the like.

Examples of the phosphoric acid ester include tricresyl phosphate, triamyl phosphate, tributyl phosphate, and the like.

Examples of the citric acid ester include tributyl acetylcitrate, triethyl citrate, triethyl acetylcitrate, and the like.

Examples of the epoxidized vegetable oil include epoxidized soybean oil, epoxidized linseed oil, and the like.

Examples of the sulfonic acid ester include alkylsulfonic acid phenyl ester and the like.

The expandable resin particles can be prepared by a method of once forming resin particles of components among the aforementioned components other than the blowing agent, and impregnating the resin particles with the blowing agent, or the like.

Examples of a method of impregnating resin particles with the blowing agent include a method of impregnating resin particles with the blowing agent in the liquid state, at a temperature lower than a boiling point of the blowing agent.

Additionally, examples of the method of impregnating resin particles with the blowing agent include a method of impregnating resin particles with the blowing agent in the liquid state at a temperature higher than a bailing point of the blowing agent under the pressurized condition, using a pressurized container.

Furthermore, examples of the method of impregnating resin particles with the blowing agent include a method of contacting the blowing agent in the gaseous state and resin particles under pressure to impregnate the blowing agent gas into resin particles.

Hitherto, from a view point of an efficiency of producing expandable resin particles, there is a tendency that a method of impregnating resin particles with the blowing agent in a short time is adopted, but expandable resin particles obtained by such a method readily become in the state where the concentration of the blowing agent at a surface area part is higher as compared with the blowing agent concentration at an inner part.

Then, the expandable resin particles become in the state where the surface area part is readily expanded and the inner part is hardly expanded.

Such expandable resin particles, when expanded, are not sufficiently expanded up to the inner part, and readily become expanded particles in the state where a core remains at the inner part.

Moreover, when the aforementioned expandable resin particles are expanded, crude cells are readily formed at a surface area part of the resulting expanded particles.

As a result, in such expandable resin particles, it becomes difficult to obtain expanded particles or a bead expanded molded article having the compact expanded state where the closed cell property is high.

Additionally, when the bead expanded molded article is formed of expanded particles having coarse cells, coarse cells are broken or shrunk upon secondary expansion of expanded particles, and there is a possibility that a surface of the bead expanded molded article is roughened.

The state where a difference between the concentration of the blowing agent at a surface area part and the concentration of the blowing agent at an inner part is great like this can be determined by conducting differential scanning calorimetric analysis on the expandable resin particles.

When the blowing agent is diffused into resin particles, usually, an apparent, glass transition temperature obtained by analyzing the resin particles by differential scanning calorimetry becomes lower than a glass transition temperature obtained concerning the original resin single substance, by influence of the plasticizing effect of a resin which is exerted by the blowing agent.

Additionally, when differential scanning calorimetric analysis on resin particles containing the blowing agent is performed, and the result is expressed by a DSC curve, with a traverse axis being the temperature, and a vertical axis being the heat quantity (upward is exothermic (exo), and downward is endothermic (endo)), shoulders which bend downwards as a temperature rises, appears on the DSC curve, at least two times, at a glass transition temperature inherent in the resin or less.

Since one of the shoulders appears at the apparent glass transition temperature, the other shoulder appears on a lower temperature side than this apparent glass transition temperature (slightly higher temperature side than a boiling point of the blowing agent).

When differential scanning calorimetric analysis is performed on expandable resin particles in which a large amount of the blowing agent exists at a surface area part, the apparent glass transition temperature appears on a lower temperature side, on the DSC curve, appearing in the form of initiating at a temperature lower than an endothermic reaction appearing on a lower temperature side than this.

In the expandable resin particles of the second state, in which an amount of the blowing agent at a surface area part is decreased to reduce a difference in the content of the blowing agent between an inner part and a surface area part than that of the first state, as compared with the expandable resin particles of the first state, in which a large amount of the blowing agent exists at this surface area part, an apparent glass transition temperature becomes high, and an endothermic reaction on a low temperature side appearing separately from this also becomes to appear on a high temperature side as compared with the first state.

In order to bring resin expanded particles utilized in forming a bead expanded molded article into the expanded state having fine cells, the expandable resin particles are more suitable in the second state than in the first state.

Then, it is preferable that, in the expandable resin particles in the present embodiment, a DSC curve measured with a differential scanning calorimeter exhibits at least two endotherms at a glass transition temperature of the resin which is a main component, and when a glass transition temperature of the resin is expressed by $T_g$ (° C.) and a boiling point of the physical blowing agent is expressed by $T_b$ (° C.), among the two endotherms, a first endotherm initiation temperature ($T_1$) appearing on a low temperature side is $T_b$° C. or more and $T_b+100$° C. or less.

Additionally, it is preferable that in the expandable resin particles, a second endotherm initiation temperature ($T_2$) appearing on a higher temperature side than the first endotherm initiation temperature is $T_g-150$° C. or more and $T_g-10$° C. or less, and a difference between first endotherm and second endotherm initiation temperatures ($T_2-T_1$) is 52° C. or less.

In addition, the temperature difference ($T_2-T_1$) is usually 1° C. or more, and in many cases, 10° C. or more.

When the highly heat-resistant resin is a PEI resin and the blowing agent is acetone, $T_1$ is preferably 85° C. or more and 105° C. or less, $T_2$ is preferably 130° C. or more and 155° C. or less, and the temperature difference is preferably 44° C. or more and 49° C. or less.

In addition, the initiation temperature of first endotherm and the initiation temperature of second endotherm can be measured using a differential scanning calorimetric device (DSC).

The initiation temperature of first endotherm and the initiation temperature of second endotherm can be usually obtained, based on a method described in JIS K7121:1987 "Testing Methods for Transition Temperatures of Plastics", in accordance with a method of obtaining an extrapolated glass transition initiating temperature of "9.3 Method of Obtaining Glass Transition Temperature" of the same Standard.

The initiation temperature of first endotherm and the initiation temperature of second endotherm shown herein refer to an intersection point between a baseline approximately parallel with a temperature axis of a DSC curve and a tangential line which is drawn at such a point that the slope of a curve at a stepwise changing part becomes the maximum.

However, a sampling method and the temperature condition are as follows.

Sampling Method and Temperature Condition

The initiation temperature of first endotherm and the initiation temperature of second endotherm are usually obtained by using a differential scanning calorimetric device (for example, DSC6220 Type, manufactured by SII Nano Technology Inc.), filling about 6 mg of a sample on a bottom of a measurement container made of aluminum without forming any space, crimping a measurement container cover made of aluminum with a sealer, cooling the sample from 30° C. to −40° C. at a rate of 20° C./min. under a nitrogen gas flow rate of 20 mL/min., retaining the sample for 10 minutes, raising the temperature from −40° C. to 260° C., and from the resulting DSC curve, calculating those initiation temperatures using analysis software attached to the device.

As the sample, a sample which was stored at each designated temperature and environment (23±1° C., 50±8% RH) for 0 to 168 hours is used, and measurement is initiated in 30 minutes after the sample is taken out from a storage place.

At that time, as a standard substance, alumina is used.

First, initiation of first endotherm and initiation of second endotherm can be specified as points at which a DSC curve changes step-like when the DSC curve is drawn with a transverse axis being the temperature and a vertical axis being the heat absorption or generation amount.

The initiation temperature of first endotherm is a temperature at an intersection point between a straight line obtained by extending a baseline on a lowest temperature side of a DSC curve obtained by the measurement toward a high temperature side and a tangential line which is drawn at such a point that the slope of a curve at a stepwise changing part becomes maximum.

Additionally, the initiation temperature of second endotherm is a temperature at an intersection point between a straight line obtained by extending a baseline on a lowest temperature side being on a higher temperature side than the initiation temperature of first endotherm obtained by the measurement toward a high temperature side and a tangential line which is drawn at such a point that the slope of a curve at a step-like changing part on a higher temperature side than the initiation temperature of first endotherm becomes maximum.

In addition, in the case of the state where small step-like change appears on way of one big step-like change, and the step-like change is altered multistepwisely, the aforementioned measurement shall be performed concerning step-like change that change in specific heat capacity toward an endothermic direction of a DSC curve is 0.2 mJ/deg·mg or more.

The expandable resin particles from which the aforementioned DSC curve is obtained when differential scanning calorimetric measurement is performed, can be obtained by, for example, the following three methods.

That is, the expandable resin particles can be prepared by a method, in which a blowing agent contacting with resin particles is made to have the relatively low concentration, and when the blowing agent and resin particles are contacted under the pressure environment, the pressure is made to be relatively low to slow impregnation of resin particles with the blowing agent (first method).

According to this method, a difference in the concentration of the blowing agent between an inner part and a surface area part of resin particles can be reduced.

Additionally, separately from this, the expandable resin particles can be prepared by a method, in which a blowing agent contacting with resin particles is made to have the relatively high concentration, resin particles are impregnated with an excessive blowing agent, and a redundant blowing agent is made to be scattered and lost from a surface of the expandable resin particles, to reduce a difference in the concentration of the blowing agent between an inner part and a surface area part (second method).

Furthermore, the expandable resin particles can be prepared by a method, in which when a blowing agent and resin particles are contacted under the pressure environment, the pressure is made to be relatively high, impregnation of resin particles with the blowing agent is carried out rapidly, and after impregnation of resin particles with an excessive blowing agent, a redundant blowing agent is made to be scattered and lost from a surface of the expandable resin particles (third method).

That is, the first method is a method of directly preparing the expandable resin particles in which the concentration gradient of the blowing agent from an inner part to a surface area part is relatively low, and the second and third methods are a method of once preparing expandable resin particles in which the concentration gradient of the blowing agent from an inner part to a surface area part is relatively high, thereafter, removing the blowing agent from a surface area part, thereby, finally reducing the concentration gradient of the expandable resin particles.

In addition, as the method of making the blowing agent scattered and lost from a surface of the expandable resin particles to remove the agent, a method of simply retaining the expandable resin particles in the atmospheric air, or a method of flowing and stirring the particles in the atmospheric air, a method of applying cold wind, warm wind or hot wind to the expandable resin particles, and the like can be adopted.

The case where differential scanning calorimetric analysis is performed on the resin expanded particles obtained by the second or third method shown in this latter section will be explained while referring to FIG. 1.

Among four DSC curves shown in the figure, a) relates to expandable resin particles in the state where PEI resin particles are impregnated with an excessive blowing agent (acetone), and b) to d) are obtained by performing treatment of making the blowing agent scattered and lost from a surface of the expandable resin particles, on this a).

In addition, an amount of the blowing agent to be scattered and lost is larger in an order of b), c), and d), and the content of the blowing agent in the expandable resin particles is as follows:

a) 16.3% by mass, b) 9.1% by mass, c) 8.7% by mass, d) 7.6% by mass.

In this way, the circumstances of impregnation of the expandable resin particles with the blowing agent can be grasped by a DSC curve to some extent.

In addition, it is desirable that expandable resin particles from which the aforementioned DSC curve is obtained, are prepared by a method of impregnating the blowing agent from a surface of resin particles and impregnating resin particles with an excessive blowing agent, thereafter, making a redundant blowing agent scattered and lost from a surface of the expandable resin particles to remove the agent, thereby, reducing a difference in the concentration of the blowing agent between an inner part and a surface area part.

The relevant preparing method has an advantage that resin particles having the relatively uniform blowing agent concentration are obtained in a relatively short time.

For example, after the expandable resin particles are heated to be formed into expanded particles (pre-expanded particles) by pre-expansion, the particles can be utilized as a material for forming a bead expanded molded article.

That is, the bead expanded molded article of the present embodiment can be obtained by performing a pre-expanding step of heat-expanding the expandable resin particles to obtain expanded particles, and an in-die molding step of heating the expanded particles in a mold to perform secondary expansion, thereby, heat fusion-bonding the expanded particles.

Since the expandable resin particles of the present embodiment have been adjusted into the state where a specific DSC curve is drawn, it is easy to obtain pre-expanded particles in the good expanded state at the pre-expanding step, and good secondary expandability is also exerted at the in-die molding step.

Accordingly, the expandable resin particles of the present embodiment are suitable for forming a bead expanded molded article in the good expanded state.

In addition, in the pre-expanded particles, it is preferable that the bulk density is within the predetermined range so that in-die molding for forming a bead expanded molded article can be readily carried out.

In the pre-expanded particles, when the bulk density is excessively small, there is a possibility that it becomes difficult to make a bead expanded molded article obtained by in-die molding using the pre-expanded particles excellent in closed cell property. On the other hand, in the pre-expanded particles, when the bulk density is excessively high, it becomes difficult to form a bead expanded molded article excellent in lightness.

For this reason, in the pre-expanded particles, the bulk density is preferably 0.025 g/cm³ or more, and more preferably 0.04 g/cm³ or more. The bulk density of the pre-expanded particles is preferably 0.9 g/cm³ or less, and more preferably 0.64 g/cm³ or less.

In addition, the bulk density of the pre-expanded particles can be calculated by the equation below, by obtaining a mass of naturally fallen pre-expanded particles by freely falling the pre-expanded particles in a measuring cylinder, and the apparent volume of the pre-expanded particles obtained by reading a marked line of the measuring cylinder.

$$\text{Bulk density (g/cm}^3\text{)=mass of pre-expanded particles (g)/volume of pre-expanded particles (cm}^3\text{)}$$

Additionally, it is preferable that the pre-expanded particles have the average cell diameter of 10 μm or more and 1,200 μm or less.

In addition, the average cell diameter of the pre-expanded particles can be calculated as follows.

That is, the average cell diameter can be obtained by cutting the pre-expanded particles with a razor blade into about a half, taking a photograph of a cross section at magnification of 18 using a scanning electron microscope ("S-3000N" manufactured by Hitachi, Ltd.), and printing an image of a photographed cross section on an A4 paper, and calculating the diameter based on the image.

Specifically, an arbitrary segment (length 300 mm) is drawn at sixth places on a paper on which the image has been printed, an average chordal length for each segment is calculated from the number of cells overlapping on this segment by the following (A), the following (B) is calculated from the average chordal length to obtain the cell diameter (C), and cells diameters obtained concerning six segments can he averaged to obtain the average cell diameter.

However, the segments are drawn so that they point contact with cells as less as possible, and when they point contact therewith, the relevant cell(s) is (are) included in the number of cells.

$$\text{Average chordal length }(t)\text{=length of segment/(cell number} \times \text{magnification of photograph)} \quad (A)$$

$$\text{Cell diameter }(C)=t/0.616 \quad (B)$$

Additionally, it is preferable that the pre-expanded particles contain a certain amount or more of the blowing agent so that in-die molding for forming a bead expanded molded article can be readily carried out.

It is preferable that the plasticizing effect due to the blowing agent is exerted in the pre-expanded particles.

Additionally, when it is difficult to exert the desired plasticizing effect only by the blowing agent, the plasticizer may be used concurrently.

For more securely exerting the plasticizing effect, it is preferable that the pre-expanded particles contain the blowing agent at the ratio of 0.1% by mass or more and 20% by mass or less.

Particularly, in the previous in-die molding of the pre-expanded particles by steam heating using saturated steam, restriction is generated in a maximum temperature of steam depending on a withstand pressure of a molding machine. For this reason, generally, in-die molding at around 160° C. or more at which saturated steam corresponds to 0.5 MPa (gauge pressure) is difficult.

It is particularly preferable that an amount of the blowing agent to be impregnated into the pre-expanded particles is 6% by mass or more, so that the pre-expanded particles can be expanded well at this temperature region or less.

In addition, an impregnation amount of the blowing agent (% by mass) can be calculated from change in a mass when heated in an oven.

Specifically, an amount of the blowing agent to be impregnated into the expandable resin particles or the pre-expanded particles (% by mass) can be obtained by precisely weighing about 1.5 g of the expandable resin particles or the pre-expanded particles use this as a sample for measurement, heating the sample in an oven at 260° C. for 2 hours, allowing it to stand under the environment of an air temperature of 23° C. and relative humidity of 50% for 2 hours, thereafter, measuring a mass, and calculating the amount by the equation below.

In addition, when a surface of the expandable resin particles or the pre-expanded particles is wet with water or the like, after water is sufficiently wiped with a clean cloth or the like, measurement is performed.

$$\text{Blowing agent impregnation amount (\% by mass)=(mass before heating (g)−mass after heating (g))/mass before heating (g)}$$

Additionally, it is referable that when the plasticizer is contained in the pre-expanded particles, it is contained so that a total amount of the plasticizer and the blowing agent becomes the ratio of 0.1% by mass or more and 20% by mass or less in the relevant pre-expanded particles.

Since the pre-expanded particles are secondarily expanded by heating, in-die molding is possible by utilizing this secondary expandability, and this becomes useful for forming a bead expanded molded article.

As heating when the expandable resin particles are prepared into pre-expanded particles, or the pre-expanded particles are subjected to in-die molding, a heating method using oil, hot air, steam or the like as a heating medium, a radiation heating method with a heater or the like, a microwave heating method, an electromagnetic induction heating method or the like can be adopted.

Particularly, in a step of expanding the pre-expanded particles to prepare a bead expanded molded article, use of steam as a heating medium is advantageous in secondary expandability or fusion bondability between secondarily expanded particles. A method of using steam as a heating medium also has an advantage that existing facility can be inverted to a different use.

In this way, the pre-expanded particles contain an organic-based physical blowing agent at preferably 3% by mass or more, and more preferably (6% by mass or more, in that secondary expandability or fusion bondability between secondarily expanded particles becomes advantageous.

Additionally, it, is preferable that the pre-expanded particles exhibit a specified DSC curve when subjected to differential scanning calorimetric analysis.

When the blowing agent is contained in the pre-expanded particles, usually, an apparent glass transition temperature obtained by subjecting the pre-expanded particles to differential scanning calorimetric analysis becomes lower than a glass transition temperature obtained concerning the original resin single substance, by influence of the plasticizing effect of a resin which is exerted by the blowing agent.

Additionally, when differential scanning calorimetric analysis on resin particles containing the blowing agent is performed, and the result is expressed by a DSC curve with a transverse axis being the temperature and a vertical axis being the heat quantity (upward is exotherm (exo) and downward is endotherm (endo)), shoulders which bend downwards as a temperature rises, appear at a glass transition temperature inherent to a resin or less.

In the pre-expanded particles which are advantageous in secondary expandability or fusion bondability between secondarily expanded particles, it is suitable that a heat stream difference (Y difference) per unit mass in this endotherm is great.

In the case where the pre-expanded particles are a PEI resin and the blowing agent is acetone, when a heat flow value per unit mass at 67° C. (Tg−150° C.) is expressed by (Y1), and a minimum value of a heat flow value per unit mass between 67° C. to 207° C. (Tg−10° C.) is expressed by (Y2), a difference between them (Y1−Y2) is preferably 0.170 mW/mg or more.

In addition, the heat flow difference per unit mass can be measured using a differential scanning calorimetric device (DSC).

A sampling method and the temperature condition are as follows.

Sampling Method and Temperature Condition, as well as Method of Obtaining Heat Flow Difference A heat flow difference is measured based on a method described in JIS K7122:2012 "Testing Methods for Heat of Transitions of Plastics".

Using a differential scanning calorimetric device DSC6220 Type (manufactured by SII Nano Technology Inc.), about 6 mg of a sample is filled on a bottom of a simple closed measurement container made of aluminum, which has been subjected to Arozin treatment, without forming any space, a temperature is raised from 30° C. to 290° C. at a rate of 20° C./min. under a nitrogen gas flow rate of 20 mL/min., and from the resulting DSC curve, a heat flow difference (mW) is calculated using analysis software attached to the device.

As the sample, a sample which was stored at each designated temperature and environment is used, and this is taken out from a storage place, and charged into the measurement container in 30 minutes.

As a standard substance at that time, alumina is used.

The heat flow difference can be specified as a difference between a heat flow value at Tg−150° C. (in the case of PEI resin, 67° C. is adopted due to Tg=217° C.) and a maximum heat flow value in an endothermic direction during (Tg−150° C.) to (Tg−10° C.), from the DSC curve obtained by the above measurement, with a vertical axis being the endothermic or exothermic quantity, and a transverse axis being the temperature.

The heat flow difference per unit mass can be obtained by the heat flow difference and a mass of a measurement sample, and can be calculated by the following equation.

Heat flow difference per unit mass (mW/mg)=heat flow difference (mW)/mass of measurement sample (mg)

In the present embodiment, for example, as the blowing agent, acetone is adopted, and pre-expanded particles can be prepared by heating the expandable resin particles with steam or hot wind.

In the present embodiment, the steam is supplied to a molding cavity filled with the pre-expanded particles, and a bead expanded molded article in which the pre-expanded particles are thermally fusion-bonded well can be obtained.

The bead expanded molded article has the apparent density of preferably 0.032 g/cm$^3$ or more and 0.6 g/cm$^3$ or less, and the average cell diameter of preferably 10 μm or more and 1,200 μm or less.

By setting the apparent density to 0.032 g/cm$^3$ or more, the bead expanded molded article exerts excellent lightness.

Additionally, by setting the apparent density to 0.64 g/cm$^3$ or less, the bead expanded molded article exerts excellent mechanical strength.

Additionally, by setting the average cell diameter to 10 μm or more, in the bead expanded molded article, even when an expanding ratio is improved, formation of open cells is suppressed.

Further, by setting the average cell diameter to 1,200 μm or less, the bead expanded molded article exerts excellent mechanical strength and, at the same time, exhibits good appearance.

The apparent density of the bead expanded molded article can be obtained, for example, as follows.

Apparent Density of Bead Expanded Molded Article

A test piece of length 25 mm×width 25 mm×thickness 25 mm is cut from a sample after 72 hours or longer from molding, so that original cells of a material are not changed, the test piece is subjected to conditioning for 16 hours under the environment of Symbol 23/50, 2-Class of JIS K7100:1999, a dimension and a mass of the test piece are measured, and the apparent density is calculated by the following equation.

In addition, the dimension of the test piece can be measured using "DIGIMATIC" CD-15 Type manufactured by Mitutoyo Corporation.

Apparent density (g/cm$^3$)=test piece mass (g)/test piece volume (cm$^3$)

In the bead expanded molded article, it is preferable that a majority of the blowing agent existing in the pre-expanded particles has been removed at the time of molding, so that deformation or the like is not generated after molding, and it is preferable that the bead expanded molded article becomes in the state where a higher glass transition temperature is exhibited as compared with pre-expanded particles.

As such the above, in the bead expanded molded article, a dimension change rate by a heating test under 180° C.×7 days becomes −1.5% or more and 1.5% or less, and the bead expanded molded article becomes easy to be utilized in various highly heat-resistant members or flame retardant members.

The dimension change rate by the heating test under 180° C.×7 days can be obtained as described below.

Method of Obtaining Dimension Change Rate

The heating dimension change rate of the expanded molded article can be measured by the B method described in JIS K6767:1999 "Cellular Plastics—Polyethylene—Methods of Test".

Specifically, a test piece in which a planar shape is a square having one side of 150 mm and the thickness is that of the expanded molded article is excised from the expanded molded article, and the heating dimension change rate can be measured using the relevant test piece.

First, three straight lines (length 100 mm) which are parallel with one another in a longitudinal direction and a transverse direction are marked on a central part of the test piece at an interval of 50 mm.

Then, concerning a longitudinal direction and a transverse direction, the length of each of three straight lines is measured, and an additive average thereof ($L_0$) is adopted as the initial dimension.

Thereafter, the test piece is allowed to stand in a hot, air circulating drier at 180° C. over 168 hours, a heating test is performed, and the test piece is taken out and is allowed to stand at 25° C. over 1 hour.

Then, the length of each of three straight lines in a longitudinal direction and a transverse direction which were marked on a surface of the test piece is measured again, an additive average thereof ($L_1$) is adopted as the dimension after heating, and the heating dimension change rate is calculated based on the following equation.

Dimension change rate (%)=$(L_1-L_0)/(L_0)\times 100$ (%)

In addition, the expandable resin particles, the pre-expanded particles, and the bead expanded molded article are not limited to only the above exemplified ones, and a variety of modifications can be further added to the above-exemplified embodiment.

Second Embodiment

Then, as a second embodiment of the present invention, pre-expanded particles obtained by hot cutting a resin composition containing a blowing agent while extruding the composition from an extruder, and a method for preparing a bead expanded molded article of the pre-expanded particles will be explained.

The pre-expanded particles of the present embodiment are pre-expanded particles used in forming a bead expanded molded article by in-die molding, are resin particles containing an organic-based physical blowing agent together with a resin, and have been preliminarily expanded before in-die molding.

The pre-expanded particles in the present embodiment are obtained by hot cutting while being extruded from an extruder, and have been prepared into a particulate foam by expanding upon the extrusion.

The pre-expanded particles are resin particles consisting of a resin composition and having cells in the interior, include mainly a highly heat-resistant resin having a glass transition temperature of 180° C. or more, and have the bulk density of 0.04 g/cm$^3$ or more and 0.9 g/cm$^3$ or less.

When the pre-expanded particles of the present embodiment have the bulk density of less than 0.04 g/cm$^3$, there is a possibility that it becomes difficult, to make a bead expanded molded article obtained by in-die molding using the relevant pre-expanded particles excellent in closed cell property.

On the other hand, when the bulk density of the pre-expanded particles exceeds 0.9 g/cm$^3$, it becomes difficult to form a bead expanded molded article having excellent lightness.

That is, the pre-expanded particles of the present embodiment have the suitable bulk density for obtaining a bead expanded molded article which has the low density and is excellent in mechanical property.

In addition, the bulk density of the pre-expanded ides can be obtained by the method explained in the first embodiment.

When the pre-expanded particles have the excessively small particle diameter, there is a possibility that secondary expandability becomes deteriorated.

On the other hand, when the pre-expanded particles have the excessively large particle diameter, deteriorated filling into a mold becomes easy to occur at in-die molding.

From such a thing, the pre-expanded particles have the average volume obtained by averaging volumes of respective particles, which corresponds to preferably a volume of a sphere having the diameter of 1 mm to 15 mm, and more preferably a volume of a sphere having the diameter of 1 mm to 10 mm.

In other words, in the pre-expanded particles, the average particle diameter represented by the diameter of a sphere having the same volume as the average volume is preferably 1 mm or more and 15 mm or less, and more preferably 1 mm or more and 10 mm or less.

A point that a glass transition temperature of the highly heat-resistant resin which is a main component of the pre-expanded particles is preferably 300° C. or less, and more preferably 260° C. or less is common to the first embodiment.

As the highly heat-resistant resin, one kind alone is not required to be contained in the pre-expanded particles, but two or more kinds may be contained in the pre-expanded particles.

The pre-expanded particles can also contain a resin having a glass transition temperature of lower than 180° C. in addition to the highly heat-resistant resin, and contain the highly heat-resistant resin at preferably 50% by mass or more, more preferably 75% by mass or more, and particularly preferably 90% by mass or more.

It is particularly preferable that, in the pre-expanded particles, a resin to be contained therein is composed substantially only of the highly heat-resistant resin.

When a boiling point of the organic-based physical blowing agent is excessively low as compared with a glass transition temperature of the highly heat-resistant, resin, there is a possibility that the organic-based physical blowing agent is volatilized before the pre-expanded particles are sufficiently softened, upon formation of the bead expanded molded article using the pre-expanded particles. For this reason, by containing the organic-based physical blowing agent having a predetermined boiling point, the pre-expanded particles become suitable for forming the bead expanded molded article having good expandability.

The organic-based physical blowing agent is preferably an organic compound having a boiling point of 100° C. or more, and preferably an organic compound having a boiling point of 120° C. or more.

Since when a boiling point of the organic-based physical blowing agent is excessively high, it becomes necessary to excessively heat to a high temperature in order to expand the pre-expanded particles in in-die molding, it is preferable that the organic-based physical blowing agent has a boiling point of 220° C. or less.

Additionally, as the organic-based physical blowing agent, one having the plasticizing effect on the highly heat-resistant resin is preferable.

That is, as the organic-based physical blowing agent, one having an apparent glass transition temperature observed when a glass transition temperature of the resin composition constituting the pre-expanded particles is measured, which is lower than a glass transition temperature originally possessed by the highly heat-resistant resin is preferable. As the organic-based physical blowing agent, an organic-based physical blowing agent which can make the apparent glass transition temperature lower than a boiling point of the relevant organic-based physical blowing agent is particularly preferable.

In other words, in the pre-expanded particles of the present embodiment, it is preferable that, by containing the organic-based physical blowing agent, a glass transition temperature of the resin composition is lower than a glass transition temperature of the highly heat-resistant resin. When a glass transition temperature of the resin composition is expressed by $Tg_1$ (° C.), a glass transition temperature of the highly heat-resistant resin is expressed by $Tg_2$ (° C.), and a boiling point of the organic-based physical blowing agent is expressed by Tb (° C.), it is preferable that the pre-expanded particles have a relationship shown in the following (1):

$$Tg_1 < Tb < Tg_2 \qquad (1).$$

By satisfying a relationship of the above (1), the pre-expanded particles become in the sufficiently softened state in in-die molding, and can sufficiently exert expanding power due to the organic-based physical blowing agent. For this reason, the pre-expanded particles of the present embodiment have an advantage for obtaining the bead expanded molded article which is excellent in fusion bondability between particles.

Additionally, by satisfying the relationship of (1), the pre-expanded particles can exert expanding power due to the organic-based physical blowing agent even when they are not excessively heated to a high temperature in in-die molding. For this reason, it becomes possible to hardly give influence of thermal degradation or the like to the bead expanded molded article.

From such a thing, it is preferable that the pre-expanded particles contain the organic-based physical blowing agent which can reduce a glass transition temperature ($Tg_1$) of the resin composition more than a glass transition temperature ($Tg_2$) of the highly heat-resistant resin by 10° C. or more, and it is preferable that the pre-expanded particles have a relationship shown in the following (2):

$$Tg_1 < Tb < (Tg_2 - 10° \text{ C.}) \qquad (2).$$

It is more preferable that the pre-expanded particles contain the organic-based physical blowing agent which can reduce a glass transition temperature ($Tg_1$) of the resin composition more than a glass transition temperature ($Tg_2$) of the highly heat-resistant resin by 20° C. more.

Examples of the organic-based physical blowing agent include hydrocarbons, alcohols, diols, ketones, ethers, and the like.

In view of safety at use, the organic-based physical blowing agent is preferably methyl phenyl ether, ethylene glycol, propylene glycol or the like.

The organic-based physical blowing agent is contained in the pre-expanded particles at the content of preferably 2% by mass or more, and preferably 3% by mass or more, in a point that the agent can more securely exert the plasticizing effect.

In addition, the preferable content of the organic-based physical blowing agent in the pre-expanded particles is usually 10% by mass or less.

The content of the organic-based physical blowing agent in the pre-expanded particles can he measured, for example, by the known method such as a head space GC/MS method, and heating loss measurement with a differential thermal and thermal mass simultaneously measuring device.

The pre-expanded particles can further contain, for example, the cell adjusting agent exemplified in the first embodiment.

The cell adjusting agent is blended, for example, at 0.01 to 2 parts by mass based on 100 parts by mass of the resin. A blending amount of the cell adjusting agent based on 100 parts by mass of the resin is more preferably 0.02 to 1 part by mass.

It is preferable that the pre-expanded particles are prepared with an extruder, as described above.

More particularly, it is preferable that the pre-expanded particles are prepared by performing an extrusion step of using an extruder and a mold having one or more nozzles, melt-kneading a resin composition containing a resin and an organic-based physical blowing agent in the extruder in the state where the mold is mounted at a tip of the extruder, and extrusion-expanding the resin composition from the nozzles in the atmospheric pressure environment, and a granulating step of forming the extrusion-expanded resin composition into particles.

In place of such method, the pre-expanded particles can also be prepared by a method of forming resin particles in the expanded state, not containing a blowing agent, and immersing the resin particles in an organic-based physical blowing agent which has become in the liquid state at a temperature of not higher than a boiling point of the organic-based physical blowing agent, a method of allowing resin particles to exist in a gas of an organic-based physical blowing agent, at a temperature at which the resin particles are not thermally shrunk, being not lower than a boiling point of the blowing agent, or the like, but preparation with the above extruder is preferable in that steps can be simplified as compared with other methods.

As the method of forming the extrusion-expanded resin composition into particles to obtain pre-expanded particles (resin expanded particles), a method of cutting and granulating a strand-like foam obtained by extrusion expansion from a nozzle, or a method of hot cutting while the resin composition in the melt state is extruded from a nozzle, thereby, granulating the composition can be adopted.

In addition, in the above hot cutting, depending on a discharge amount from the nozzle and a size of pre-expanded particles to be formed, usually, a cutter which rotates at the rotation number of 2.000 to 10,000 rpm can be utilized.

In addition, in a general granulating method, a strand or a sheet is formed of a resin composition, the strand or the sheet is sufficiently cooled, and this is cut to prepare a particulate product.

To the contrary, hot cutting is a method of continuously extruding a resin composition in the melt state from a nozzle, accumulating this resin composition in the melt state at a tip of the nozzle until the composition becomes a certain degree of a size, and cutting the composition with a cutter.

This granulating method is named "hot cutting" since an accumulated matter formed of the resin composition at a nozzle tip is cut before the accumulated matter is cooled down.

From such a thing, in the granulating method by hot cutting, resin particles having a shape near a sphere are readily obtained.

Additionally, the granulating method by hot cutting has an advantage that, by adjusting an amount of the resin composition to be extruded from a nozzle per unit time, and timing of cutting with a cutter, resin particles having a uniform size are readily obtained.

In this hot cutting, a general hot cutting granulator can be used.

This hot cutting granulator will be explained while referring to the figures.

Figure 2A:
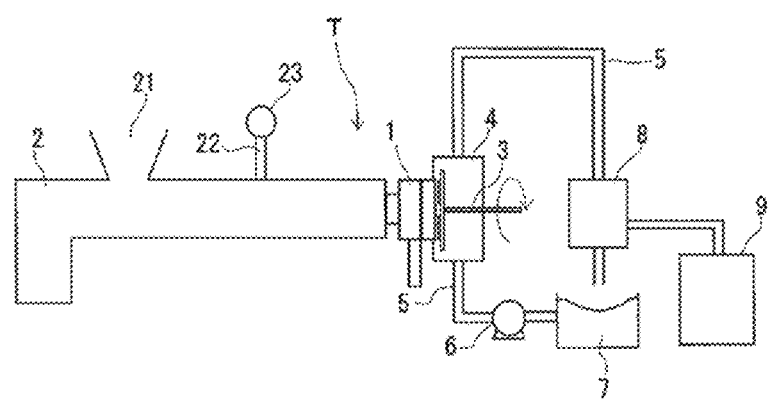
FIG. 2a schematic showing a device configuration of a hot cutting granulator.
Figure 2B:
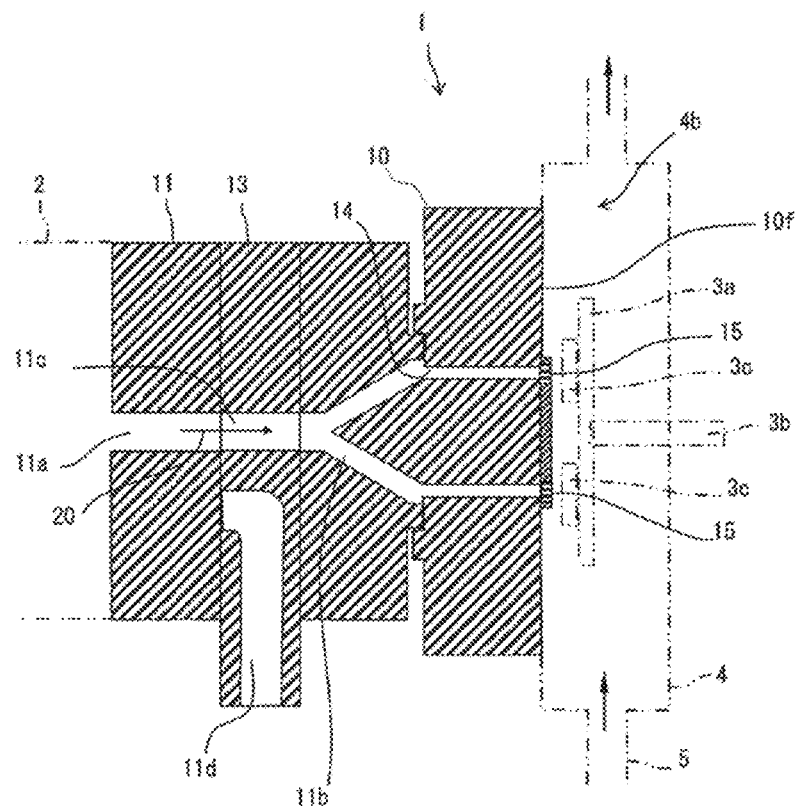
FIG. 2b is a schematic cross-sectional view showing the interior of a mold of a hot cutting granulator.

FIG. 2a is a view showing a device configuration of a hot cutting granulator, and FIG. 2b is a schematic cross-sectional view showing an internal structure of a hot cutting granulator.

As shown in the figures, the hot cutting granulator T comprises an extruder 2 in which a mold 1 for granulation is attached to a tip, and a chamber 4 housing a cutter 3.

The extruder 2 is intended for melt-kneading a resin composition containing a blowing agent, and the cutter 3 is intended for periodically cutting a resin composition in the melt state, which is continuously discharged from a nozzle 15 of the mold 1.

That is, the hot cutting granulator T is configured so that the resin composition is extrusion-expanded, and at the same time, the resin composition is cut with the cutter 3 to prepare resin expanded particles.

The hot cutting granulator T of the present embodiment is configured so that, in order to control a degree of expanding of the resin expanded particles, the resin expanded particles can be cooled with water by introducing cooling water into the chamber 4.

Specifically, in the hot cutting granulator T of the present embodiment, a pipeline 5 for flowing circulating water is connected to the chamber 4, and one end of this pipeline 5 (upstream side than the chamber 4) is connected to a eater tank 7 via a water feed pump 6.

Additionally, at the other end of the pipeline 5 (downstream side than the chamber 4), a dehydration treatment portion 8 for separating the resin expanded particles from circulating water and dehydrating and drying them is provided.

Expanded beads which have been separated, dehydrated and dried with this dehydration treatment portion 8 are sent to housing equipment 9, and water is returned to the water tank 7.

To specifically explain the hot cutting granulator T of the present embodiment, the extruder 2 comprises a hopper 21 for introducing a resin into the extruder, a blowing agent supply port 22 for introducing a blowing agent into the extruder, a high-pressure pump 23, and the like.

As shown in FIG. 2b, the mold 1 comprises a body portion 10, and a holder 11 which is fixed on a tip side (right side in the figure) of the extruder 2, and the body portion 10 is fixed at the extruder 2 via the holder 11.

The holder 11 comprises a flow path 11a, 11b for a resin, which is communicated with a cylinder of the extruder 2.

In the holder 11, an intermediate portion in a resin extrusion direction is mobile (mobile upward and downward, in FIG. 2b), and the mobile portion becomes a valve 13 for interrupting flow of a resin to the body portion 10, and discharging the resin to the outside.

The valve 13 has a first flow path 11c which is penetrating from an upstream side to a downstream side and a second flow path 11d which goes from an upstream side to a side portion of the holder 11, and is configured so that these flow paths can be switched.

The body portion 10 is configured that the resin composition in the melt state which is supplied from the extruder 2 through the holder 11 can be discharged from a plurality of nozzles 15 opening in a tip surface of the body portion 10, through a plurality of resin paths 14.

In a front surface 10f of the body portion 10, a plurality of nozzles 15 are arranged on a circumference, and the nozzles 15 are arranged at a predetermined interval in a circumferential direction.

The cutter 3 comprises a substrate 3a which is disposed to be opposite to the front surface 10f of the body portion 10, a rotation axis 3b about which the substrate 3a is rotated, and a plurality of cutting blades 3c mounted on one side of the substrate 3a.

The substrate 3a is disposed so that a surface facing toward the body portion 10 becomes approximately parallel with the front surface 10f of the body portion 10, and the cutting blades 3c are mounted on a side of the body portion 10.

The cutter 3 of the present embodiment is configured so that the substrate 3a can be rotated as described above, while maintaining the state being parallel with the front surface 10f of the body portion 10.

The plurality of the cutting blades 3c are disposed with an edge thereof being toward the body portion 10, and are mounted on the substrate 3a so as to draw a circumference corresponding to the circumference on which the nozzles 15 are disposed, at rotation of the substrate 3a.

The cutter 3 of the present embodiment, is rotated so that the edge of the cutting blade 3b is discharged from the nozzle 15 when passes in front of the nozzle 15 to cut a resin composition staying at a tip of the nozzle, thereby, resin expanded particles can be formed.

The resin expanded particles can be utilized as pre-expanded particles for forming a bead expanded molded article, as they are, or by further adjusting a expanding degree.

Since the pre-expanded particles are secondarily expanded by heating, they can be in-die molded by utilizing this secondary expandability, and this becomes useful for forming a bead expanded molded article.

The pre-expanded particles include mainly a highly heat-resistant resin having a glass transition temperature of 180° C. or more For this reason, it is difficult to apply a method for heating pre-expanded particles in a molding cavity using steam, which is used in general in-die molding, to the pre-expanded particles of the present embodiment.

That is, there is a possibility that the pre-expanded particles of the present embodiment cannot be brought into the sufficient softened state unless a very high pressure of steam is used, and it is preferable that, in in-die molding, heating is performed not by steam, but by heat conduction or radiant heat from a molding cavity or the like.

In the in-die molding of the present embodiment, it is preferable to use, for example, a method which can heat the molding cavity to a high temperature (a method of heating with a heat medium such as oil, a method of heating with a heater or the like, an electromagnetic induction heating method, a microwave heating method and the like). In the present embodiment, by heating a molding cavity filled with the pre-expanded particles to the range of ±30° C. of a glass transition temperature of the highly heat-resistant resin ([$Tg_2$–30° C.] to [$Tg_2$30° C.]), and heating the pre-expanded particles, in a molding cavity, with the heated mold, a bead expanded molded article in which the pre-expanded particles are thermally fusion-bonded well can be obtained.

Since when a temperature of the molding cavity is lower than ($Tg_2$–30° C.), sufficient heat is hardly conducted to the pre-expanded particles at a central part in the mold, a total temperature rising rate is also slowed, there is a possibility that the contained blowing agent is made to be scattered and lost, before the pre-expanded particles are sufficiently secondarily expanded.

On the other hand, when a temperature of the molding cavity is higher than ($Tg_2$+30° C.), before the pre-expanded particles at a central part in the mold are sufficiently heated, the pre-expanded particles in the vicinity of a wall surface in the mold are thermally melted, and it becomes difficult to obtain a totally uniform bead expanded molded article, in which a difference in quality between a surface area and the interior is small.

From such a thing, it is preferable that a temperature of the molding cavity in the in-die molding is in the range of ±20° C. of a glass transition temperature of the highly heat-resistant resin ([$Tg_2$−20° C.] to [$Tg_2$+20° C.]).

Additionally, it is preferable that heating is performed so that a temperature rising rate in the interior of the mold becomes 1° C./min. or more, in a point that, upon in-die molding, it becomes easy to obtain a totally uniform bead expanded molded article in which a difference in quality between a surface area and the interior is small.

Since the bulk density of the pre-expanded particles of the present embodiment is 0.04 g/cm$^3$ or more and 0.9 g/cm$^3$ or less, the bead expanded molded article obtained as described above can be made to be excellent in not only heat-resistance, but also closed cell property and lightness.

In addition, in the above description, an aspect using the pre-expanded particles which are a particulate pre-foam in in-die molding of a expanded molded article is exemplified, but for example, the expanded molded article can also be prepared by adopting a strand-like or sheet-like pre-foam.

In that case, in the strand-like pre-foam, the thickness thereof is preferably 1 mm to 15 mm, and more preferably 1 mm to 10 mm.

The thickness of the strand-like pre-foam is obtained, for example, as the diameter of a circle having the same area as an average cross-sectional area, the average cross-sectional area being obtained by dividing a volume of the pre-foam by the length thereof.

Further, when the sheet-like pre-foam is adopted, the average thickness thereof is preferably 1 mm to 15 mm, and more preferably 1 mm to 10 mm.

The thickness of the sheet-like pre-foam is obtained, for example, by dividing the volume of the pre-foam by the area thereof.

The apparent density of this strand-like pre-foam or sheet-like pre-foam, obtained in accordance with JIS K7222, is preferably 0.04 g/cm$^3$ or more and 1.2 g/cm$^3$ or less, more preferably 0.05 g/cm$^3$ or more and 1.1 g/cm$^3$ or less, and particularly preferably 0.06 g/cm$^3$ or more and 1.0 g/cm$^3$ or less.

When in-die molding is performed using the strand-like pre-foam or sheet-like pre-foam, it is preferable that filling is performed so that the following conditions are satisfied, when a molding space in a molding cavity (product volume) is expressed by V (cm$^3$), and a mass of the pre-foam to be filled into the mold is expressed by M (g).

$$0.04 \text{ g/cm}^3 \leq (M/V) \leq 0.9 \text{ g/cm}^3$$

As such the above, an expanded molded article having performance equivalent to that of the bead expanded molded article obtained by in-die molding the pre-expanded particles can be prepared using a strand-like pre-foam or a sheet-like pre-foam.

In addition, detailed explanation is not repeated more herein, but the pre-expanded particles and the bead expanded molded article of the present embodiment are not limited to only the above exemplification, but further various modifications can be added to the above-exemplified aspect.

The bead expanded molded article prepared in the first embodiment or the second embodiment is excellent in strength and heat resistance.

Moreover, since the bead expanded molded article prepared in these embodiments has a high glass transition temperature, high strength is also maintained at a high temperature.

Accordingly, the general resin foam hardly exerts excellent strength unless it has a high closed cell rate, while the bead expanded molded article of the present embodiment exerts excellent strength even when it has an open-cell rate to some extent or more.

Moreover, since in the bead expanded molded article of the present embodiment, processing at a high temperature is performed in formation of the expandable resin particles or formation of the pre-expanded particles, and in-die molding using the pre-expanded particles is also performed at a high temperature, a low-molecular component such as a degradation product of a resin may exist in a foam film.

Additionally, the blowing agent may remain in the bead expanded molded article of the present embodiment.

In addition, among the resins as exemplified above, a polyetherimide (PEI) resin or a polyethersulfone (PESU) resin has the characteristic that it allows a resin molded article to exert high dimensional stability.

Additionally, the polyethersulfone (PESU) resin has the characteristic that a linear expansion coefficient is low as compared with other resins.

For this reason, molded articles prepared with these resins exert high dimensional stability even at places where change in the environment such as a temperature and humidity is drastic.

Meanwhile, when the closed cell rate of the bead expanded molded article is high, a degradation product of the blowing agent or the resin remaining in a foam film is volatilized, and this increases an internal pressure of cells to expand a volume of the bead expanded molded article, when the bead expanded molded article is brought into the heated state.

Then, when the closed cell rate of the bead expanded molded article is high, there is a possibility that the aforementioned characteristics possessed by a resin such as the PEI resin and the PESU resin, itself, are not sufficiently utilized effectively.

Further, the degradation product of the resin or the blowing agent is considered to be a cause for volatile organic compounds (VOC), even when it does not influence dimensional stability of the bead expanded molded article.

Then, the bead expanded molded article of the present embodiment has the open-cell rate of preferably 10% or more, more preferably 20% or more, and particularly preferably 30% or more, for rapidly releasing the degradation product or the blowing agent.

Additionally, the open-cell rate of the bead expanded molded article is preferably 90% or less, and more preferably 85% or less.

In addition, the open-cell rate of the bead expanded molded article can be measured by the following method.

Open-Cell Rate Measuring Method

Five cubic test pieces of 25 mm×25 mm×25 mm are excised from the bead expanded molded article.

At that time, all six sides of the test piece become a cross section, and a skin of the molded article is made not to remain on the test piece.

Additionally, a cross section of the test piece is finished with a slicer to extremely reduce collapsed cells.

After each test piece is allowed to stand for 16 hours under the environment of JIS K7100-1999 Symbol 23/50, 2-Class, and measurement is performed under the environment of JIS K7100-1999 Symbol 23/50, 2-Class.

At that time, first, the dimension of the test piece is measured up to 1/100 mm using a measuring instrument (for example, product name "Digimatic Caliper", manufactured by Mitutoyo Corporation), to obtain the apparent volume ($cm^3$).

Then, using an air-comparison pycnometer (for example, "1000 Type", manufactured by Tokyoscience Co., Ltd.), the volume ($cm^3$) of the sample to be measured is obtained by the 1-½-1 atm method.

In addition, as the air-comparison pycnometer, one corrected with a standard sphere (large 28.9 cc, small 8.5 cc) is used.

Then, the open-cell rate (%) of each sample calculated by the following equation.

Open-cell rate (%)=100×(apparent volume−volume measured with air-comparison pycnometer)/apparent volume As the open-cell rate of the bead expanded molded article, an arithmetic average of the open-cell rate of the five test pieces is adopted.

Additionally, based on the same reason, it is preferable that, in the bead expanded molded article prepared in the first embodiment or the second embodiment, a through hole is formed in an interior foam film to a certain rate or more.

Specifically, it is preferable that the bead expanded molded article has a through hole between cells, where one or more are adjacent per 10 cells.

The ratio of cells having a through hole can be obtained by cutting the bead expanded molded article, and confirming the presence or absence of the through hole concerning randomly selected cells on a cross section thereof.

More specifically, the ratio of cells having the through hole can be confirmed by the following method.

First, the bead expanded molded article is cut with a razor blade into the size of around 6 mm square to prepare a sample for measurement.

Using a scanning electron microscope (SEM), a photograph of a cross section of the sample is taken at magnification of 30, 100 cells are randomly selected on the photographed cross section, and the number of cells (n) having the through hole in the cells is counted to obtain the ratio of cells having the through hole (n/100).

Examples of SEM to be used at that time include product name "S-3000N" of Hitachi, Ltd. and the like.

In addition, when the cell diameter is too large to observe 100 cells, the cross section is observed at magnification of less than 30.

When cells are too large to confirm 100 cells at minimum magnification of SEM, the ratio of cells having the through hole is obtained from all cells on the photographed cross section.

This regard will be explained while referring to the figures.

Figure 3:
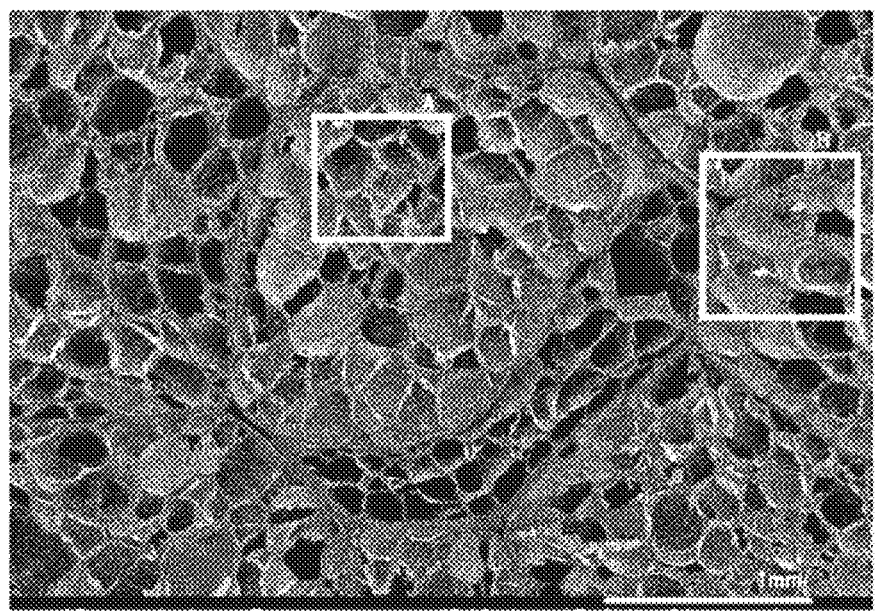
FIG. 3 is a scanning electron microscope (SEM) photograph showing the state of cells of a bead expanded molded article related to a first embodiment.

FIG. 3 is obtained by photographing with SEM of a cross section of the bead expanded molded article made of a PEI resin which was prepared by the method described in "Assessment 1 of Manufacturing of Bead Expanded Molded Article" in Examples described later.

Figure 4A:
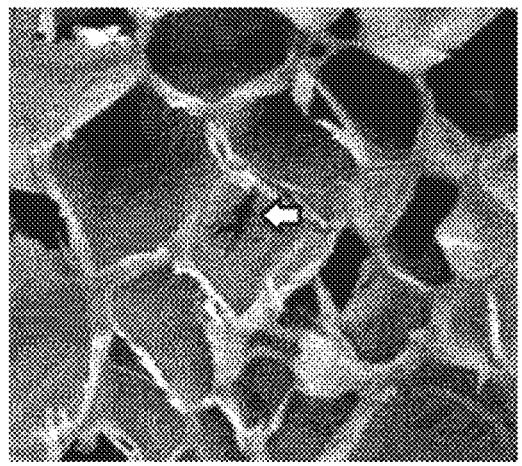
FIG. 4a is an enlarged view of an A part of FIG. 3 (SEM photograph).
Figure 4B:
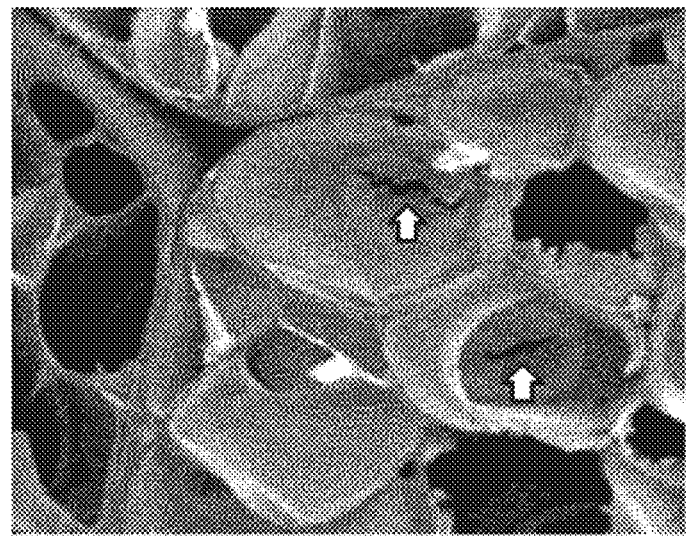
FIG. 4b is an enlarged view of a B part of FIG. 3 (SEM photograph).

Additionally, FIG. 4a and FIG. 4b are images obtained by enlarging square enclosures A and B of FIG. 3, respectively.

Figure 5:
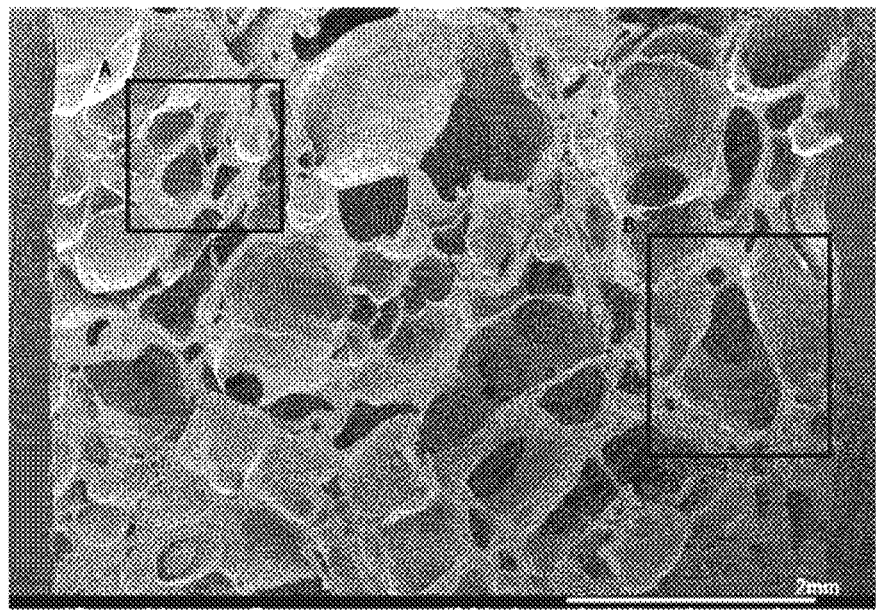
FIG. 5 is a SEM photograph showing the state of cells of a bead expanded molded article related to a second embodiment.

Next, FIG. 5 is obtained by photographing with SEM of a cross section of the bead expanded molded article made of a PESU resin which was prepared by the method described in "Assessment 2 of Manufacturing of Bead Expanded Molded Article" in Examples described.

Figure 6A:
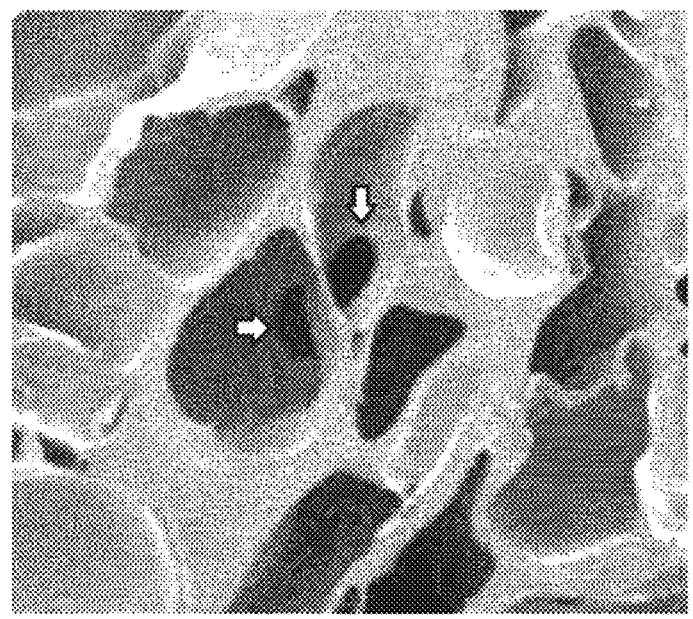
FIG. 6a is an enlarged view of an A part of FIG. 5 (SEM photograph).
Figure 6B:
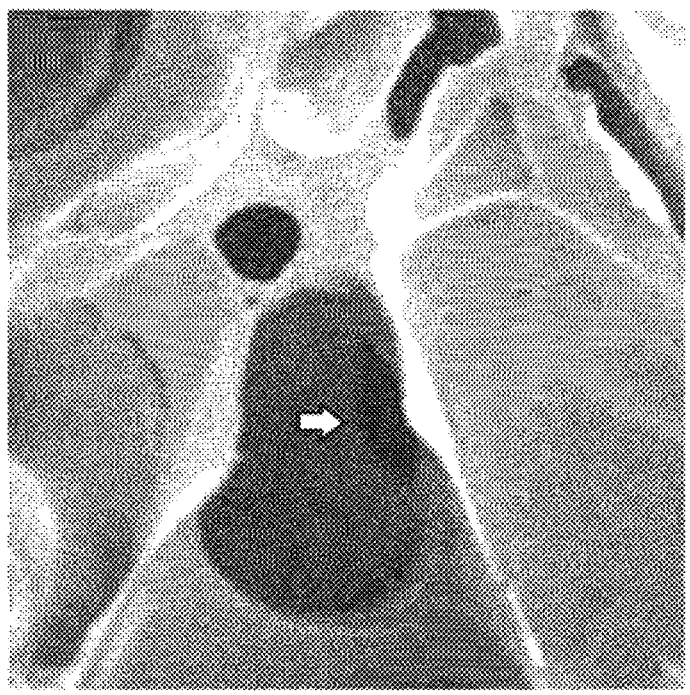
FIG. 6b is an enlarged view of a B part of FIG. 5 (SEM photograph).

Additionally, FIG. 6a and FIG. 6b are images obtained by enlarging square enclosures A and B of FIG. 5, respectively.

In addition, in FIG. 3, a cracked through hole can be confirmed at a part shown with a block arrow in FIG. 4a and FIG. 4b.

Additionally, in FIG. 6, a round pore-like through hole can be confirmed at a part shown with a block arrow in FIG. 6a and FIG. 6b.

In addition, the open-cell rate and the number of the through holes of the bead expanded molded article can be usually adjusted by the content of the blowing agent in the pre-expanded particles and the heating condition under which the pre-expanded particles are in-die molded.

The thus prepared bead expanded molded article is excellent in heat resistance, strength, lightness and the like.

In the present embodiment, the bead expanded molded article and the pre-expanded particles, as well as the method for producing them were exemplified above, but the present invention is not limited to the above exemplification.

That is, in the present invention, a variety of modifications can be added to the matters exemplified above.

EXAMPLES

Then, the present invention will be explained in further detail by way of Examples, but the present invention is not limited by them.

Assessment 1 of Manufacturing of Bead Expanded Molded Article

Case 1-1

A polyetherimide resin of diameter φ2.3 mm×length 3.3 mm (SABIC Innovative Plastics, Ultem (registered trademark) 1000) was dried with a dehumidification drier at 160° C. for 5 hours.

Then, the dried resin was placed into a monoaxial screw extruder (φ40 mm, L/D 40), and melted under the condition below, a strand-like non-expanded polyetherimide resin which had come out from a mold (caliber φ1.5 mm, land length 1 mm) attached to the extruder was cooled in a water tank, and pelletized to prepared resin pellets having diameter φ1.0 mm×length 1.1 mm.

<Extrusion Condition>
Melting temperature: 350° C.
Temperature of mold at extruder tip: 350° C.
Supply amount: 0.9 kg/h Step of Preparing Expandable Resin Particles: Blowing Agent Impregnating Method Into a pressure-resistant container having the volume of 5 L were placed 3 L of acetone and 500 g of polyetherimide resin pellets (hereinafter, PEI resin pellets), the materials were heated at 70° C. for 14 hours, and the PEI resin pellets were impregnated with acetone.

The PEI resin pellets impregnated with acetone were allowed to stand for 24 hours in the atmospheric air to obtain expandable resin particles containing 9.1% by mass of acetone.

Step of Preparing Pre-Expanded Particles:
Pre-Expansion

By applying hot wind at 160° C. for 30 seconds to the expandable resin particles obtained in the above step, pre-expanded particles having the bulk density of 0.106 g/cm³ (bulk magnification 12 times) were obtained.

The average cell diameter of the resulting pre-expanded particles was 300 μm.

Cases 1-2, 1-3

According to the same manner as that of Case 1-1 except that, by allowing to stand in the atmospheric air, a part of the blowing agent contained in the resin particles was removed to change the content of the blowing agent e expandable resin particles, and the condition for preparing the pre-expanded particles shown in Table 1 was adopted, pre-expanded particles were prepared.

In these cases, pre-expanded particles having fine cells and the bulk density shown in Table 1 could be obtained.

Case 1-4

According to the same manner as that of Case 1-1 and by changing the polyetherimide resin from Ultem (registered trademark) 1000 to Ultem (registered trademark) 1010, PEI resin pellets were impregnated with acetone.

By applying an air blast to the PEI resin pellets impregnated with acetone by a blower for 30 minutes, expandable resin particles containing 13.4% by mass of acetone were obtained.

Pre-expanded particles were prepared using the expandable resin particles under the condition shown in Table 1, and pre-expanded particles having fine cells and the bulk density shown in Table 1 could be obtained.

Cases 1-5 to 1-7

According to the same mariner as that of Case 1-4 except that the time for applying an air blast with a blower was changed from 30 minutes to 2 hours, and the condition shown in Table 1 was adopted as the condition for preparing pre-expanded particles, pre-expanded particles were prepared.

In these Cases, pre-expanded particles having fine cells and the bulk density shown in Table 1 could be obtained.

Cases 1-8 to 1-10

According to the same manner as that of Case 1-1 except that the polyetherimide resin was changed from Ultem (registered trademark) 1000 to Ultem (registered trademark) 1010, and the content of the blowing agent in the expandable resin particles was changed by removing a part of the blowing agent contained in the resin particles by allowing to stand in the atmospheric air, as well as the condition shown in Table 1 was adopted as the condition for manufacturing the pre-expanded particles, pre-expanded particles were prepared.

In these Cases, pre-expanded particles having fine cells and the bulk density shown in Table 1 could be obtained.

Case 1-11

Step of Preparing Bead Expanded Molded Article:
In-Die Molding

The residual amount of the blowing agent in the pre-expanded particles of Case 1-5 was 10.8% by mass. Additionally, a difference in heat flow which had been read from the result of DSC measurement was 0.224 mW/mg (a of FIG. 7).

The pre-expanded particles were filled into a mold for molding having the internal volume of 300 mm×400 mm×30 mm, saturated steam at 0.32 MPa was applied to the pre-expanded particles under the condition of Table 2, and in-die molding was carried out, in which the pre-expanded particles were secondarily expanded by steam heating.

By the in-die molding, a bead expanded molded article having fine cells and good appearance was prepared.

The dimensional change rate of the resulting bead expanded molded article by a heating test under 180° C.×7 days was assessed, and as a result, the rate was −1.32%.

Cases1-12 to 1-15

According to the same manner as that of Case 1-11 except that the pre-expanded particles to be used were changed to pre-expanded particles of each of Case 1-6, and 1-8 to 10, a bead expanded molded article was prepared.

The dimensional change rate of the resulting bead expanded molded article by a heating test under 180° C.×7 days was assessed, and as a result, the rate was within −1.50% in all cases.

Case 1-16

Step of Preparing Expandable Resin Particles:
Blowing Agent Impregnating Method, Step of
Preparing Pre-Expanded Particles: Pre-Expansion According to the same manner as that of Case 1-1, PEI resin pellets were impregnated with acetone.

Then, after extraction of a PEI resin from acetone, the expandable resin particles were pre-expanded under the condition shown in Table 1, without adjusting the content of the blowing agent in the expandable resin particles, to prepare pre-expanded particles.

The average cell particle of the resulting pre-expanded particles was as coarse as 1,500 μm, and a size of the cell diameter was ununiform.

Case 1-17

Step of Preparing Expandable Resin Particles:
Blowing Agent Impregnating Method, Step of
Preparing Pre-Expanded Particles: Pre-Expansion According to the same manner as that of Case 1-4, PEI resin pellets were impregnated with acetone.

Then, after extraction of a PEI resin from acetone, the expandable resin particles were pre-expanded under the condition shown in Table 1, without adjusting the content of the blowing agent in the expandable resin particles, to prepare pre-expanded particles.

The average cell diameter of the resulting pre-expanded particles was as coarse as 1,500 μm, and the size of the cell diameter was ununiform.

Case 1-18

Step of Preparing Expandable Resin Particles: Blowing Agent Impregnating Method, Step of Preparing Pre-Expanded Particles: Pre-Expansion According to the same manner as that of Case 1-4, PEI resin pellets of diameter φ 1.0 mm×length 1.1 mm were obtained.

By placing the PEI resin pellets into a 300 cc pressure resistant container, and retaining them in the carbon dioxide atmosphere at 20° C. and 3 MPa for 48 hours, carbon dioxide was impregnated therein.

Thereafter, after a pressure in the pressure-resistant container was reduced to a normal temperature, the PEI resin pellets were taken out from the pressure-resistant container, and hot wind at 260° C. was applied to the pellets for 60 seconds, thereby, the pellets were pre-expanded to prepare pre-expanded particles.

The average cell diameter of the resulting pre-expanded particles was as very fine as 13 μm, but the bulk density was as high as 0.363 g/cm$^3$, and it was hard to expand the particles.

Case 1-19

Step of Preparing Bead Expanded Molded Article: In-Die Molding

The residual amount of the blowing agent in the pre-expanded particles of Case 1-7 was 5.5% by mass.

Figure 7:
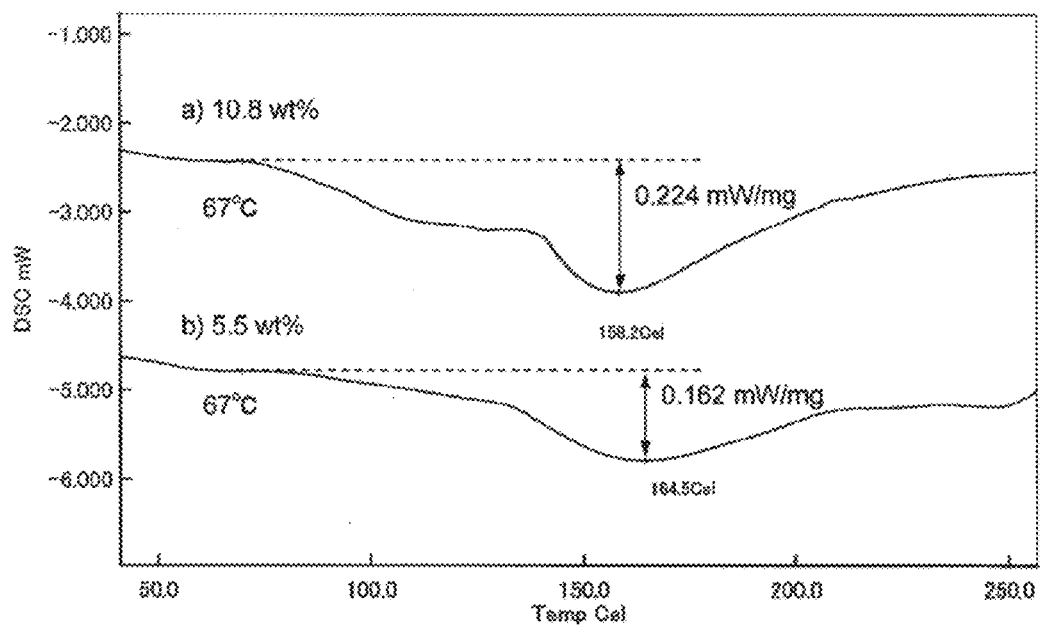
FIG. 7 is a graph drawing a DSC curve of pre-expanded particles having different blowing agent residual amounts.

Additionally, a difference in heat flow which has been read from the result of DSC measurement was 0.162 mW/mg (b of FIG. 7).

According to the same manner as that of Case 1-11 except that the pre-expanded particles of this Case 1-7 were used, in-die molding was carried out.

However, by the same manner as that of Case 1-11, pre-expanded particles were not fusion-bonded, and could not be molded.

TABLE 1

| | | | Case | | | | | | |
|---|---|---|---|---|---|---|---|---|---|
| | | | 1-1 | 1-2 | 1-3 | 1-4 | 1-5 | 1-6 | 1-7 |
| Expandable resin particles | Raw material | | Ultem 1000 | Ultem 1000 | Ultem 1000 | Ultem 1010 | Ultem 1010 | Ultem 1010 | Ultem 1010 |
| | Blowing agent impregnation amount (% by mass) | Acetone | 9.1 | 8.7 | 7.6 | 13.4 | 12.8 | 12.8 | 12.8 |
| | | Carbon dioxide | — | — | — | — | — | — | — |
| | Result of DSC measurement | T1 (° C.) | 88.9 | 90.6 | 100.0 | 72.9 | 75.8 | 75.8 | 75.8 |
| | | T2 (° C.) | 135.3 | 138.6 | 146.9 | 122.5 | 123.9 | 123.9 | 123.9 |
| | | T2 − T1 (° C.) | 46.4 | 480 | 46.9 | 49.6 | 48.1 | 48.1 | 48.1 |
| Pre-expanded particles | Conditions for preparation | Heating method | Hot wind at 160° C. | Hot wind at 160° C. | Hot wind at 160° C. | Hot wind at 140° C. | Hot wind at 140° C. | Hot wind at 160° C. | Hot wind at 200° C. |
| | | Time (s) | 30 | 30 | 30 | 30 | 30 | 30 | 30 |
| | Bulk density (g/cm$^3$) | | 0.106 | 0.159 | 0.254 | 0.071 | 0.106 | 0.071 | 0.032 |
| | Average cell diameter (μm) | | 300 | 280 | 250 | 230 | 200 | 180 | 230 |
| | Appearance of pre-expanded particles* | | A | A | A | A | A | A | A |

| | | | Case | | | Case | | |
|---|---|---|---|---|---|---|---|---|
| | | | 1-8 | 1-9 | 1-10 | 1-16 | 1-17 | 1-18 |
| Expandable resin particles | Raw material | | Ultem 1010 | Ultem 1010 | Ultem 1010 | Ultem 1000 | Ultem 1010 | Ultem 1010 |
| | Blowing agent impregnation amount (% by mass) | Acetone | 9.8 | 8.5 | 7.5 | 16.3 | 16.1 | — |
| | | Carbon dioxide | — | — | — | — | — | 9.3 |
| | Result of DSC measurement | T1 (° C.) | 301 | 92.6 | 100.3 | 60.4 | 63.5 | 204 |
| | | T2 (° C.) | 135.0 | 137.6 | 144.5 | 113.5 | 115.7 | 220 |
| | | T2 − T1 (° C.) | 44.6 | 45.0 | 442 | 53.1 | 52.2 | 16.0 |
| Pre-expanded particles | Conditions for preparation | Heating method | Hot wind at 160° C. | Hot wind at 160° C. | Hot wind at 160° C. | Hot wind at 160° C. | Hot wind at 160° C. | Hot wind at 260° C. |
| | | Time (s) | 30 | 30 | 30 | 30 | 30 | 60 |
| | Bulk density (g/cm$^3$) | | 0.106 | 0.159 | 0.254 | 0.085 | 0.085 | 0.363 |
| | Average cell diameter (μm) | | 280 | 250 | 220 | 1,500 | 1,500 | 13 |
| | Appearance of pre-expanded particles* | | A | A | A | B | B | B |

*Criteria for determining "assessment" are as follows:
A: Readily highly-expandable and cells are fine.
B: Hardly highly-expandable or cells are coarse.

TABLE 2

|  |  | Case | | | | | Case |
|---|---|---|---|---|---|---|---|
|  |  | 1-11 Use of those of Case 1-5 | 1-12 Use of those of Case 1-6 | 1-13 Use of those of Case 1-8 | 1-14 Use of those of Case 1-9 | 1-15 Use of those of Case 1-10 | 1-19 Use of those of Case 1-7 |
| Pre-expanded particles | Residual amount of blowing agent (% by mass) | 10.8 | 10.2 | 7.8 | 7.1 | 6.5 | 5.5 |
|  | Difference in heat flow which has been read from DSC measurement (mW/mg) | 0.224 | 0.216 | 0.192 | 0.180 | 0.176 | 0.162 |
| Molding conditions | Steam pressure (MPa) | 0.32 | 0.32 | 0.32 | 0.32 | 0.32 | 0.32 |
|  | Time (s) | 30 | 30 | 30 | 30 | 30 | 30 |
| Result of molding* | | A | B | B | B | B | C |
| Heating dimensional change rate (%) | | −1.32 | −1.30 | −1.38 | −0.99 | −0.76 | — |
| Open-cell rate (%) | | 33 | 56 | 54 | 50 | 45 | — |

*Criteria for determining "assessment" are as follows:
A: Good molded article having no space between particles was obtained.
B: Expandable.
C: Pre-expanded particles were not fusion-bonded and molding was impossible.

The expandable resin particles of Cases 1-1 to 1-10, and Cases 1-16 and 17 are expandable resin particles consisting of a resin composition containing a resin having a glass transition temperature of 180° C. or more and an organic-based physical blowing agent.

Additionally, the expandable resin particles of Case 1-18 are expandable resin particles consisting of a resin composition containing a resin having a glass transition temperature of 180° C. or more and a physical blowing agent.

As also seen from Table 1, in the expandable resin particles of Cases 1-1 to 1-10, a DSC curve measured with a differential scanning calorimeter exhibits at least two endotherms at not higher than a glass transition temperature of the resin which is a main component, and when a glass transition temperature of the resin is expressed by $Tg$ (° C.), a boiling point of the organic-based physical blowing agent is expressed by $Tb$ (° C.), an initiation temperature of first endotherm among the two endotherms is expressed by $T1$ (° C.), and an initiation temperature of second endotherm is expressed by $T2$ (° C.), all of the following conditions (x) to (z) are satisfied. (Glass transition temperature of PEI resin: 217° C., boiling point of acetone: 56.5° C.)

$Tb \leq T1 \leq (Tb+100° C.)$      (x)

$(Tg-150° C.) \leq T2 \leq (Tg-10° C.)$      (y)

$(T2-T1) \leq 52° C.$      (z)

On the other hand, the expandable resin particles of Case 1-16 to Case 1-18 do not satisfy all of such conditions.

Accordingly, it is seen that, for obtaining the bead expanded molded article which is excellent in heat resistance, and is in the good expanded state, it is effective that the expandable resin particles satisfy all of the above conditions (x) to (z).

Additionally, as also seen from Table 2, in the pre-expanded particles of Case 1-11 to Case 1-15, the residual amount of acetone which is the blowing agent is 6% by mass or more, and a difference in heat flow which has been read from the result of DSC measured with a differential scanning calorimeter is 0.170 mW/g or more.

On the other hand, in the pre-expanded particles of Case 1-19, the residual amount of the blowing agent is less than 6% by mass, and a difference in heat flow which has been read from the result of DSC measured with a differential scanning calorimeter is less than 0.170 mW/mg.

As such the above, it is seen that, for obtaining the bead expanded molded article in the good expanded state from a resin excellent in heat resistance, it is effective that 6% by mass or more of the blowing agent remains in the pre-expanded particles.

Additionally, it seen that, for obtaining the bead expanded molded article in the good expanded state, it is effective that a difference in heat flow of the pre-expanded particles which has been read from the result of DSC measurement is 0.170 mW/mg or more.

Assessment 2 of Manufacturing of Bead Expanded Molded Article

Preparation of Pre-Expanded Particles

As the resin having a glass transition temperature of 180° C. or more, a polyethersulfone resin (manufactured by Sumitomo Chemical Co., Ltd., product name "Sumika excel 3600G", glass transition temperature 225° C.) was prepared.

Into 100 parts by mass of the polyethersulfone resin was blended 0.5 parts by mass of a chemical blowing agent (manufactured by EIWA CHEMICAL IND. CO., LTD., product name "Polysurene EE204") as a cell preparing agent, and the mixture of them was placed into a 40 mm monoaxial extruder, and melt-kneaded.

On way to the extruder, as an organic-based physical blowing agent, propylene glycol (boiling point: 189° C.) was pressed therein at the ratio of 4% by mass, and the mixture was further melt-kneaded, to prepare a resin composition having expandability in the extruder.

When the resin composition was extrusion-expanded under the atmospheric pressure through a nozzle of a mold having φ a 1.5 mm nozzle attached to a tip of the extruder, and at the same time, allowed to cool, to obtain a strand-like foam.

By passing this strand-like foam directly through a pelletizer to cut it, pre-expanded particles having the bulk density of 0.325 g/cm³ were obtained.

In addition, a discharge amount at this time was 4.5 kg/h, and a resin temperature at extrusion was 259° C.

Additionally, when the resulting pre-expanded particles were analyzed with a differential scanning calorimetric device (DSC), it was seen that an apparent glass transition temperature of the resin composition constituting the pre-expanded particles is reduced to 183° C.

Further, when the heat loss of the pre-expanded particles was measured with a thermal mass.differential thermal analysis device (TG/DTA), it was seen that the content of the organic-based physical blowing agent is 3.7% by mass.

In addition, the heat loss was measured using a differential thermal and thermal mass simultaneously measuring device "TG/DTA6200 Type (manufactured by SII Nano Technology Inc.)".

A sampling method and the temperature condition are as follows. P A sample was measured by filling about 15 mg of the sample on a bottom of a measurement container made of platinum without forming any space, using alumina as a standard substance under a nitrogen gas flow rate of 230 mL/min.

Measurement was performed based on a TG/DTA curve when a temperature was raised from 30° C. to 400° C. at a rate of 10° C./min.

The heating residue at 400° C. was obtained from this resultant curve using analysis software attached to the device, and an amount of decrease in a mass from the original mass was adopted as the heat loss.

Preparation of Bead Expanded Molded Article

First, a molding cavity made of aluminum having the internal dimension of 300 mm×100 mm×30 mm was prepared.

Pre-expanded particles were filled into this molding cavity, and the mold was placed into a hot wind oven (manufactured by ADVANTEC, product name "DRM420DA") in which a temperature in the oven was set as 270° C., and heated.

Thereupon, a thermocouple was set so that a temperature at a mold inner wall and that of a central part in the mold can be measured.

At the time at which an inner temperature reached 230° C., the molding cavity was taken out from the hot wind oven, and allowed to cool, and a bead expanded molded article was taken out from the mold. At that time, a temperature of the mold inner wall was 240° C.

The time from placement of the molding cavity into an oven (inner temperature 27° C.) to arrival at a molded article inner temperature at 230° C. was 90 minutes, and a temperature rising rate was 2.0° C./min.

The bead expanded molded article obtained at that time had the open-cell rate of 64.1% and was excellent in lightness.

Also from above thing, it is seen that, by forming a bead expanded molded article of resin expanded particles having the bulk density of 0.04 g/cm$^3$ or more and 0.9 g/cm$^3$ or less, which is composed of a resin composition containing, as a main component, a resin having a glass transition temperature of 180° C. or more (PESU resin: glass transition temperature 225° C.), a bead expanded molded article which is excellent in heat resistance and in the good expanded state is obtained.

DESCRIPTIONS OF REFERENCE NUMERALS

1. Mold
2. Extruder
3. Cutter
15. Nozzle
T. Hot cutting granulator

What is claimed is:

1. A method for producing resin expanded particles, comprising:
   melt-kneading a resin composition including a resin and an organic-based physical blowing agent that is any one of methyl phenyl ether, ethylene glycol, and propylene glycol with an extruder, and extrusion-expanding the melt-kneaded resin composition; and
   forming the extrusion-expanded resin composition into particulate resin expanded particles,
   wherein said resin is a main component of said resin composition and said resin has a glass transition temperature of 180° C. or more, and said resin expanded particles have a bulk density of 0.04 g/cm$^3$ or more and 0.9 g/cm$^3$ or less.

2. The method for producing resin expanded particles according to claim 1, wherein said resin is at least one selected from the group consisting of polyethersulfone (PESU) resin, a polyetherimide (PEI) resin, a polyphenylsulfone (PPSU) resin, and a polysulfone (PSU) resin.

* * * * *